Figure 1:
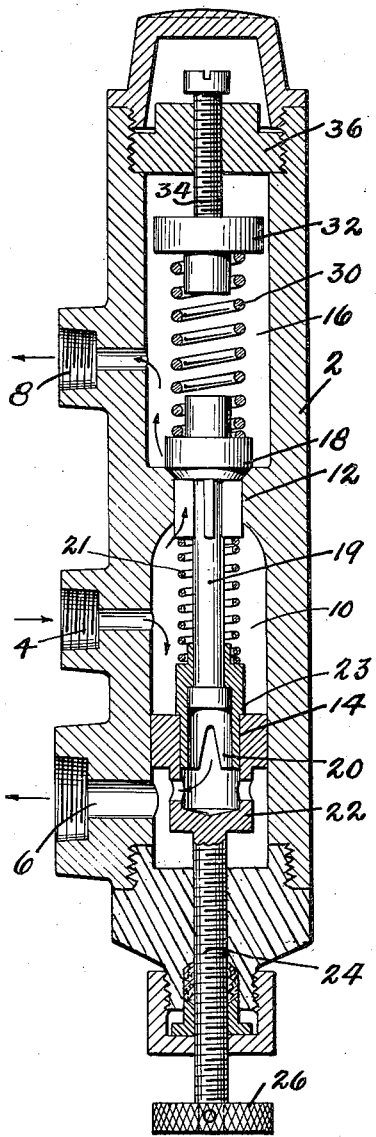

Aug. 24, 1943.  R. S. THORESEN  2,327,942

VALVE ASSEMBLY

Filed May 8, 1941

INVENTOR
Ralph S. Thoresen
BY
Kiddle, Bethell and Montgomery
ATTORNEYS.

Patented Aug. 24, 1943

2,327,942

UNITED STATES PATENT OFFICE 2,327,942

VALVE ASSEMBLY

Ralph S. Thoresen, Greenwich, Conn., assignor to Petroleum Heat and Power Company, New York, N. Y., a corporation of Delaware Application May 8, 1941, Serial No. 392,452

3 Claims. (Cl. 137—153)

This invention relates to improvements in relief and regulating valve assemblies for controlling the combustion rate of oil burners, and is directed to a valve assembly which is particularly well adapted for handling oils of different viscosities.

The assembly is adapted to be interposed between the oil pump and the burner nozzle of an oil burner.

Figure 2:
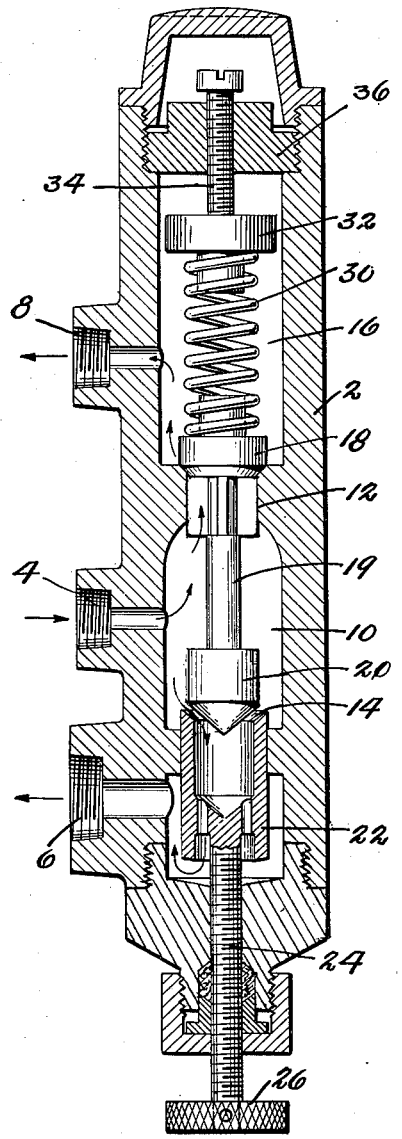

In the drawing:

Fig. 1 is a sectional view of a valve showing one embodiment of my invention; and Fig. 2 is a similar view of another embodiment of the invention.

Referring first of all to Fig. 1 of the drawing: 2 designates a valve housing provided with an intake port 4 for oil from a constant displacement pump of the type ordinarily employed in oil burner installations.

6 designates an outlet port to the burner nozzle and 8 a relief port for the return of excess oil to the supply tank.

The oil introduced into the valve housing from the supply source enters chamber 10. This chamber is provided with a port at either end, designated 12 and 14. The port 12 communicates with another chamber 16 in one wall of which is the relief port 8 already referred to and leading back to the supply tank. This port 12 is controlled by a valve 18. The port 14 is controlled by a metering valve 20.

The valve 20 has movement in a ported valve seat 22 constituting one end of the chamber 10. The valves 18 and 20 are mounted on a common stem 19, the valve 20 being movable axially of the stem. The ported seat 22 is mounted on a threaded rod 24 adapted to be adjusted by rotation of its knurled head 26. Loading spring 21 is provided on the stem 19 and abuts the inner ends of the valves 18 and 20.

The metering valve 20 is provided with a shoulder 23 adapted to engage the upper face of the valve seat 22 thereby to function as a shut-off valve.

30 designates a spring, one end of which engages the relief valve 18 and the other end a boss 32 on rod 34 threaded into a bushing 36 adjacent the top of the valve housing 2.

In operation with the loading springs 21 and 30 properly adjusted operation of the constant displacement pump which supplies oil to the chamber 10 through port 4 will cause the valve 18 to be lifted off its seat to allow oil to return through port 8 to the supply tank. Pressure will be built up in the chamber 10 by compression of spring 30. The valve seat 22 for the metering valve 20 will be adjusted axially to provide an orifice or port at 14 of a size sufficient to provide the desired flow of oil to the burner nozzle. When this flow of oil is effected the valve 18 will close under compression of the spring 30 but the valve 20 may not close entirely. An electric valve may be used to close off the oil supply to the nozzle.

With a change in viscosity of the oil it will be appreciated that the movement of the common valve stem 19 will cause the opening of the ports 12 and 14 to vary more or less in the same ratio whereby the flow of oil to the burner nozzle through the port 6 will be constant.

In the embodiment of my invention illustrated in Fig. 2, the construction employed is similar to that already described, except that I have eliminated the loading spring 21 and the valve 20 has been substituted by a needle valve 20'.

It is to be understood that I do not wish to be limited to the precise structures herein illustrated and described since various modifications and changes may be made therein without departing from the spirit and scope of my invention.

What I claim is:

1. A valve assembly for oil burners comprising in combination a valve housing provided internally with two chambers, a supply port in constant communication with one of said chambers, a discharge valve and an adjustable valve seat therefor intermediate the ends of the last mentioned chamber, means carried by said seat for manually adjusting the position thereof in its chamber, a discharge port leading from said chamber from the side of said seat opposite the said supply port, and a relief valve intermediate the two chambers for controlling the flow of oil from the supply port chamber to the other of said chambers and from thence out through a relief port, said discharge valve and said relief valve being carried by a common stem.

2. A valve assembly for oil burners comprising in combination a valve housing provided with an inlet port, a discharge port and a relief port, a discharge valve for the discharge port, a relief valve for the relief port, a common stem for the discharge and relief valves, the discharge valve being movable on said stem axially thereof, means carried by said stem for causing said discharge valve to move in an opening direction upon opening of said relief valve, a spring for imposing resistance to the movement of the relief valve, an adjustable seat for the discharge valve, and a shoulder on said discharge valve cooperating with the valve seat when the valve is fully closed to cause said valve to function as a shut-off valve.

3. A valve assembly for oil burners comprising a valve housing provided internally with a supply chamber and a relief chamber in axial alignment, an inlet port in communication with said supply chamber, an outlet port leading from said supply chamber, an outlet port leading from the relief chamber, a relief port intermediate said axially aligned chambers providing the only communication between said chambers, a relief valve for said relief port for controlling the flow of oil from the supply chamber to the relief chamber, a stem on said relief valve, a discharge valve within the supply chamber intermediate the outlet and inlet ports and carried on the stem of the relief valve, an adjustable seat for said discharge valve, and a rod carried by said seat and extending to the exterior of the housing for manual adjustment of said seat.

RALPH S. THORESEN.